(12) United States Patent
Chapman (10) Patent No.: US 8,727,318 B2
(45) Date of Patent: May 20, 2014

(54) HYDRAULIC FLOAT DOWN VALVE FOR A CAMERA DOLLY OR CAMERA CRANE

(75) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 13/553,592

(22) Filed: Jul. 19, 2012

(65) Prior Publication Data

US 2014/0021422 A1 Jan. 23, 2014

(51) Int. Cl.
- *A62B 3/00* (2006.01)
- *F15B 13/04* (2006.01)
- *F16K 11/16* (2006.01)
- *G03B 17/00* (2006.01)

(52) U.S. Cl.
USPC ............... 254/93 R; 137/636.1; 137/596.2

(58) Field of Classification Search
USPC ............... 324/93; 137/636.1, 596.2, 625.3, 137/596.17
See application file for complete search history.

(56) References Cited

U.S. PATENT DOCUMENTS

| | | |
|---|---|---|
| 4,109,678 A | 8/1978 | Chapman |
| 4,219,121 A | 8/1980 | McPeak |
| 4,590,958 A | 5/1986 | Brunner |
| 4,747,424 A | 5/1988 | Chapman |
| 4,899,097 A | 2/1990 | Chapman |
| 4,952,953 A | 8/1990 | Ridderstolpe et al. |
| 5,391,041 A | 2/1995 | Stanbury |
| 5,437,216 A | 8/1995 | Chapman |
| 5,516,070 A | 5/1996 | Chapman |
| 5,697,757 A | 12/1997 | Lindsay |
| 5,819,634 A | 10/1998 | Chapman |
| 6,073,913 A | 6/2000 | Chapman |
| 6,179,545 B1 * | 1/2001 | Petersen et al. ............... 414/537 |
| 6,247,498 B1 * | 6/2001 | Chapman ................... 137/636.1 |

(Continued)

FOREIGN PATENT DOCUMENTS

| | | |
|---|---|---|
| EP | 1298087 A1 | 4/2003 |
| GB | 2207109 A | 1/1989 |
| WO | 8910894 A | 11/1989 |
| WO | 9412424 A | 6/1994 |

OTHER PUBLICATIONS

United States Patent and Trademark Office, International Search Report and Written Opinion for PCT/US2010/044792, mailed Sep. 23, 2010.

(Continued)

*Primary Examiner* — Lee D Wilson
*Assistant Examiner* — Alvin Grant
(74) *Attorney, Agent, or Firm* — Kenneth H. Ohriner; Perkins Coie LLP (57) ABSTRACT

A camera dolly or camera crane has an arm pivotably attached to a chassis, and a hydraulic system including a hydraulic cylinder for raising the arm, a hydraulic valve and a valve control. The hydraulic valve has a normal operation mode where opening and closing of the valve is controlled by the valve control. The hydraulic valve is also provided with a float down mode, where the valve remains partially open providing an intentional slight leakage, regardless of operation of the valve control. In float down mode, as soon as the arm reaches its highest point, the arm automatically and instantaneously reverses direction and starts to move back down, in a smooth continuous movement. The hydraulic system may optionally also include a fast down valve, to allow the arm to move down quickly, even when minimally loaded.

9 Claims, 11 Drawing Sheets

(56) References Cited

U.S. PATENT DOCUMENTS

| | | | |
|---|---|---|---|
| 6,389,953 B1* | 5/2002 | Altman et al. | 91/515 |
| 6,536,325 B2 | 3/2003 | Badia Ba | |
| 6,578,819 B2 | 6/2003 | Chapman | |
| 7,121,745 B2 | 10/2006 | Chapman | |
| 7,128,479 B2 | 10/2006 | Chapman | |
| 7,252,441 B2 | 8/2007 | Chapman | |
| 7,311,452 B2 | 12/2007 | Chapman | |
| 8,033,742 B1 | 10/2011 | Chapman | |
| 8,403,486 B2* | 3/2013 | Chapman | 352/243 |
| 2002/0005112 A1 | 1/2002 | Badia Ba | |
| 2002/0112764 A1 | 8/2002 | Chapman | |
| 2003/0076480 A1 | 4/2003 | Burbulla | |
| 2003/0172598 A1 | 9/2003 | Greer | |
| 2004/0168997 A1 | 9/2004 | Irsch et al. | |
| 2005/0191049 A1 | 9/2005 | Chapman | |
| 2005/0191050 A1 | 9/2005 | Chapman | |
| 2007/0230947 A1 | 10/2007 | Chapman | |
| 2008/0002967 A1 | 1/2008 | Chapman | |
| 2011/0031203 A1 | 2/2011 | Chapman | |
| 2012/0051733 A1 | 3/2012 | Chapman | |
| 2012/0070143 A1 | 3/2012 | Chapman | |

OTHER PUBLICATIONS

EPC Communication pursuant to Article 94(3) EPC issued in application No. 05 724 101.0-2209 on Feb. 15, 2010.

United States Patent and Trademark Office, International Search Report and Written Opinion for PCT Patent Publication No. WO05/085948, mailed Aug. 11, 2005.

United States Patent and Trademark Office, International Search Report and Written Opinion for PCT/US2013/050709, Dec. 9, 2013.

* cited by examiner

Fig. 1

PRIOR ART

Fig. 2

PRIOR ART

PRIOR ART

HYDRAULIC FLOAT DOWN VALVE FOR A CAMERA DOLLY OR CAMERA CRANE

FIELD OF THE INVENTION

The field of the invention is hydraulic valves in camera dollies cranes used to raise and lower a camera.

Camera dollies and cranes are used in the television, video and motion picture industries to support and maneuver a camera. Typically, the camera dolly is on wheels and has an arm to raise and lower the camera. The camera dolly is generally moved by dolly operators or "grips", to properly position the camera, to follow the film or video sequence.

Various designs have been used to raise and lower a camera on a camera dolly. For example, U.S. Pat. No. 4,360,187 describes a two piece arm design for use in a camera dolly. The arm is raised and lowered via a hydraulic actuator and a control valve. Other camera dollies use a straight single piece beam arm or a telescoping pedestal lifted by a hydraulic or pneumatic actuator, such as described in U.S. Pat. No. 5,516,070.

The valves used to control a hydraulically driven camera dolly or crane arm should meet certain design objectives. For example, the opening and closing characteristics of the valve should allow the camera dolly operator to accurately and easily control the speed and direction of the arm movement. The valve should also allow the arm to be accurately stopped at a selected elevation. In addition, the valve should operate silently, so as not to interfere with the sound track being recorded for the motion picture or video. sequence. U.S. Pat. Nos. 4,747,424 and 4,109,678, incorporated herein by reference, describe hydraulic valves which have been successfully used in camera dollies and cranes. While these have performed well, there remains a need for ever more versatile valves, to allow camera operators to achieve desired camera movements.

SUMMARY OF THE INVENTION

A camera dolly or camera crane has an arm pivotably attached to a chassis. A hydraulic system on the chassis includes a hydraulic cylinder attached to the arm and to the base, for raising the arm, a hydraulic valve and a valve control. The hydraulic valve has a normal operation mode where opening and closing of the valve is controlled by the valve control. The hydraulic valve is also provided with a float down mode, where the valve remains partially open, regardless of operation of the valve control. When the float down mode is used, the hydraulic valve does not close completely. Rather, an intentional slight leakage is provided in the valve.

In use to perform a float down camera movement, as soon as the dolly or crane arm reaches its highest point, as selected by the user via the valve control, the arm automatically and instantaneously reverses direction and starts to move back down. Since this float down mode provides this movement automatically, the up-down movement of the arm is smoother than can normally be achieved. The hydraulic system may optionally also include a fast down valve, to allow the arm to move down quickly, even when minimally loaded.

BRIEF DESCRIPTION OF THE DRAWINGS

Other objects and features of the invention will become apparent from the following detailed description taken in connection with the accompanying drawings. It is to be understood, however, that the drawings are designed for the purpose of illustration only and are not intended as a definition of the limits of the invention.

In the drawings, wherein similar reference characters denote similar elements throughout the several view.

DETAILED DESCRIPTION OF THE DRAWINGS

FIGS. 1-7 are prior art from U.S. Pat. No. 6,247,498. FIGS. 8-12 show a new valve system for providing a float down camera movement. While discussed here as used on a camera dolly, the valve system may also similarly be used to provide a float down camera movement with a camera crane or a camera pedestal.

Figure 1:
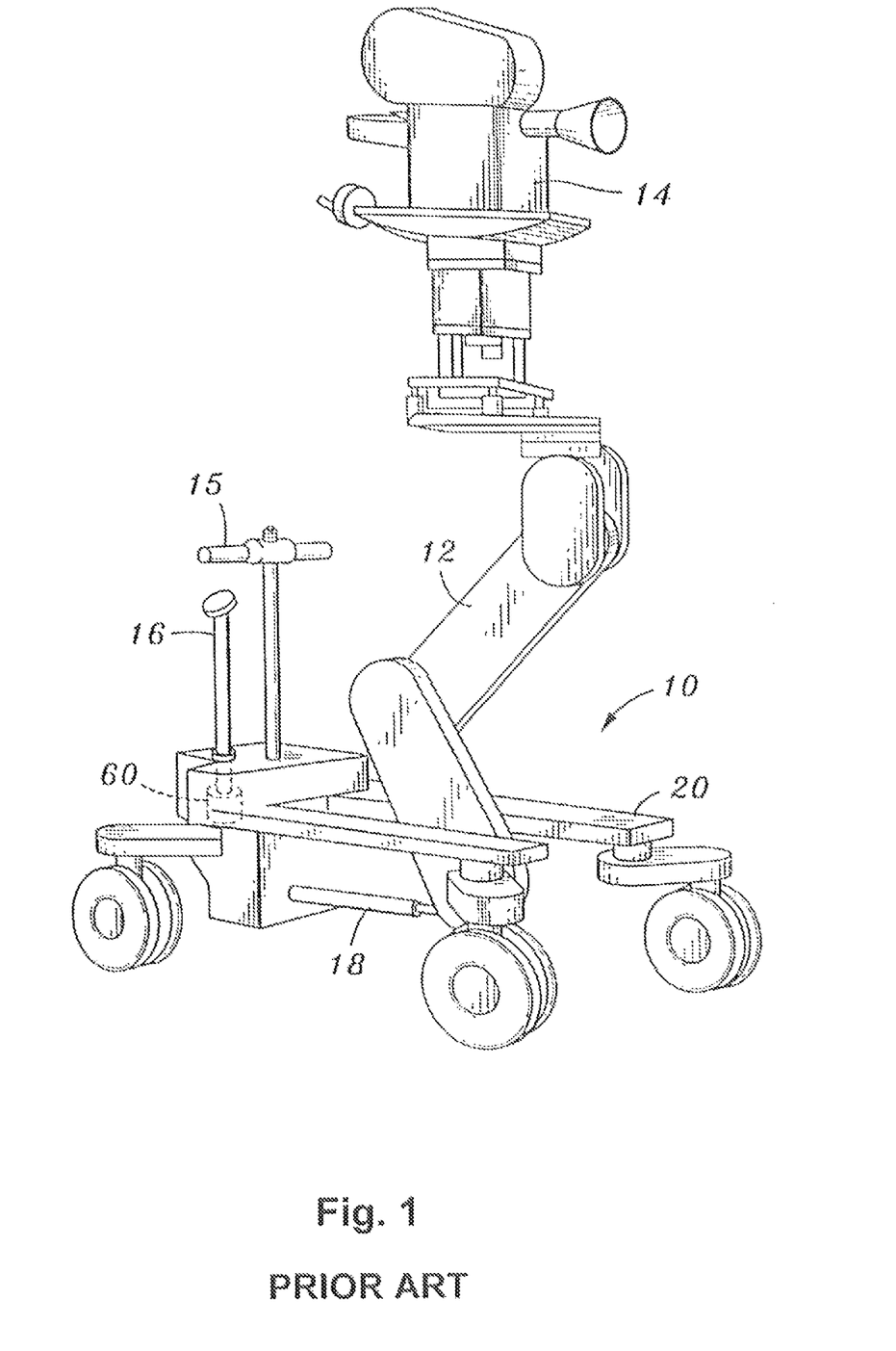
FIG. 1 is a perspective view of a camera dolly.
Figure 2:
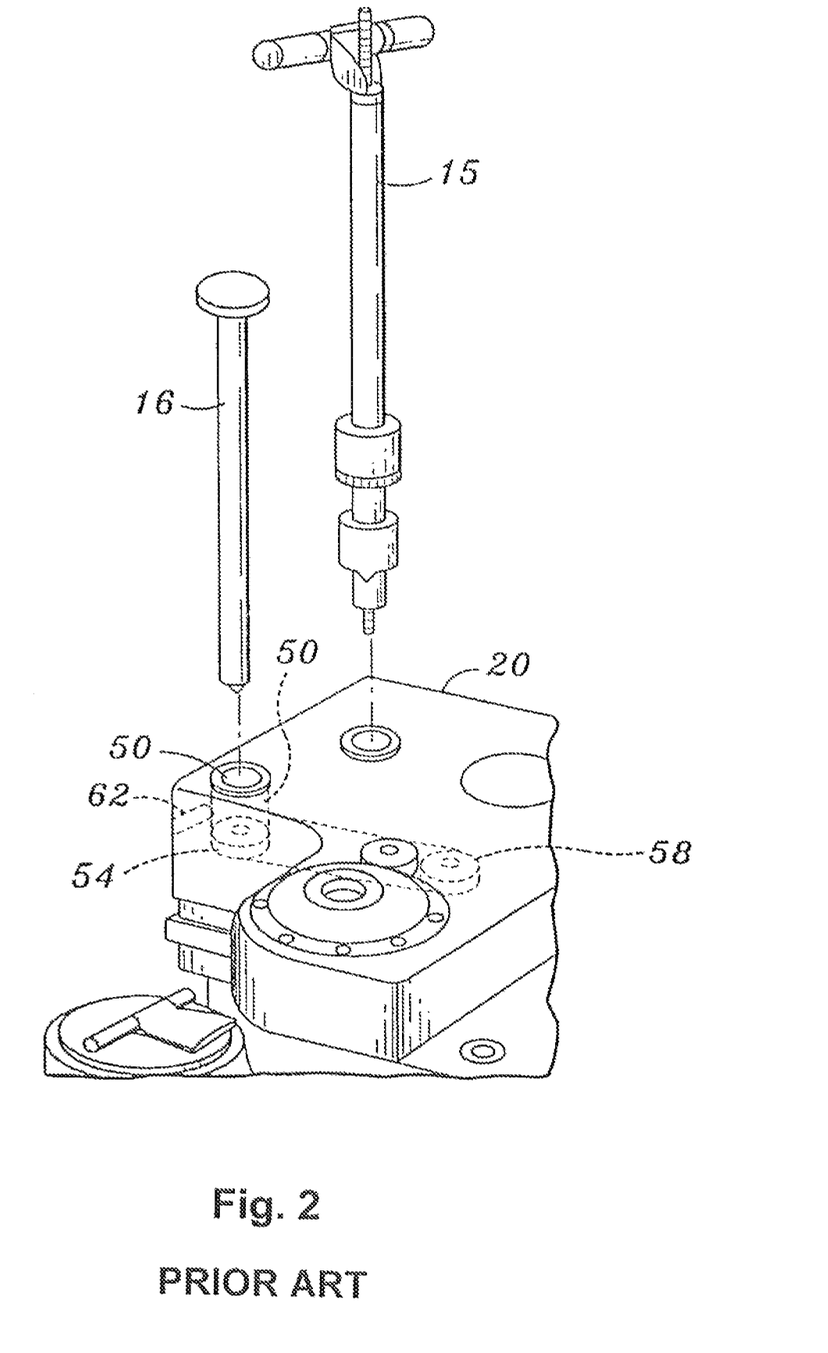
FIG. 2 is an enlarged perspective view of the back end of the camera dolly of FIG. 1, containing a hydraulic valve.

Turning now in detail to the drawings, as shown in FIGS. 1 and 2, a camera dolly 10 has an arm 12 supporting a motion picture or video camera 14. An arm control 16 at the back of the camera dolly 10 is turned to open and close a hydraulic valve 60, to raise and lower the arm 12. The hydraulic valve 60 controls the flow of hydraulic fluid to a hydraulic actuator 18 extending from the chassis 20 of the dolly 10 to the arm 12. A steering bar 15 at the back end of the dolly 10 is used to steer the wheels of the dolly, and to shift between different steering modes.

Figure 3:
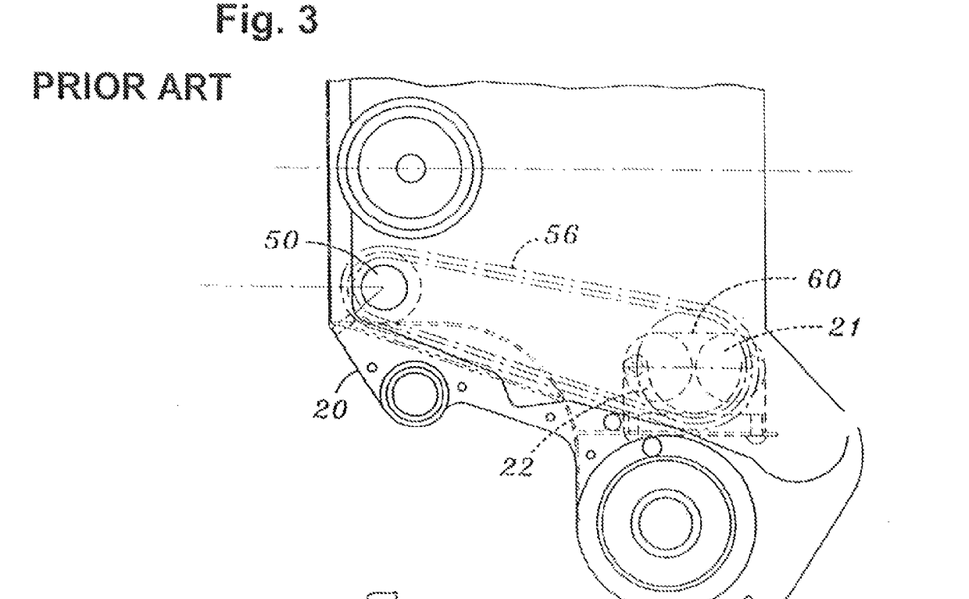
FIG. 3 is a partial plan view of the back end of the camera dolly as shown in FIG. 2.
Figure 4:
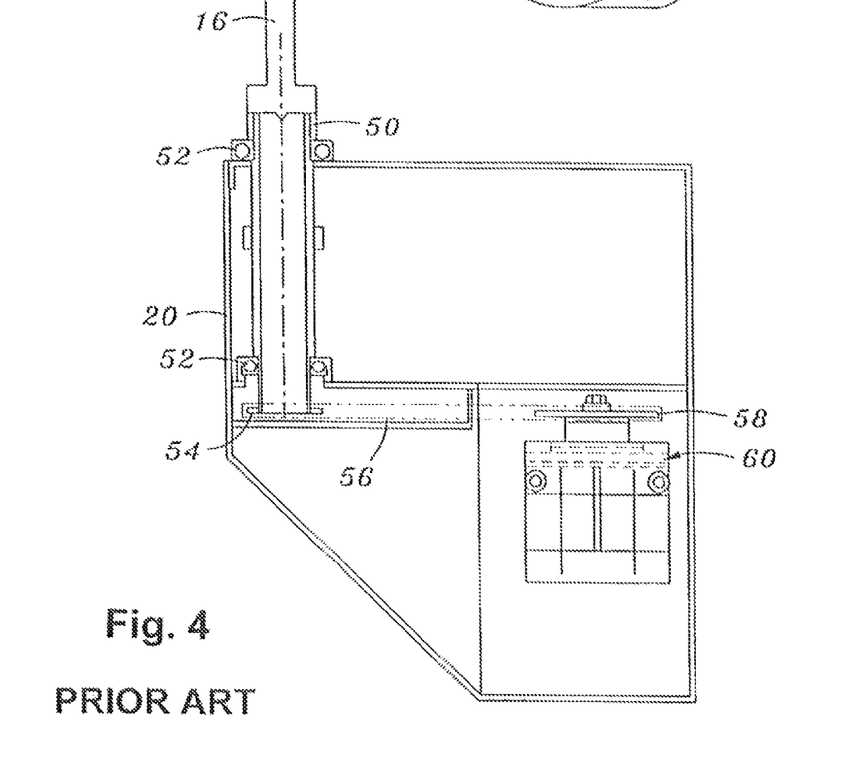
FIG. 4 is a side elevation view in part section of the back end of the camera dolly as shown in FIG. 2.
Figure 5:
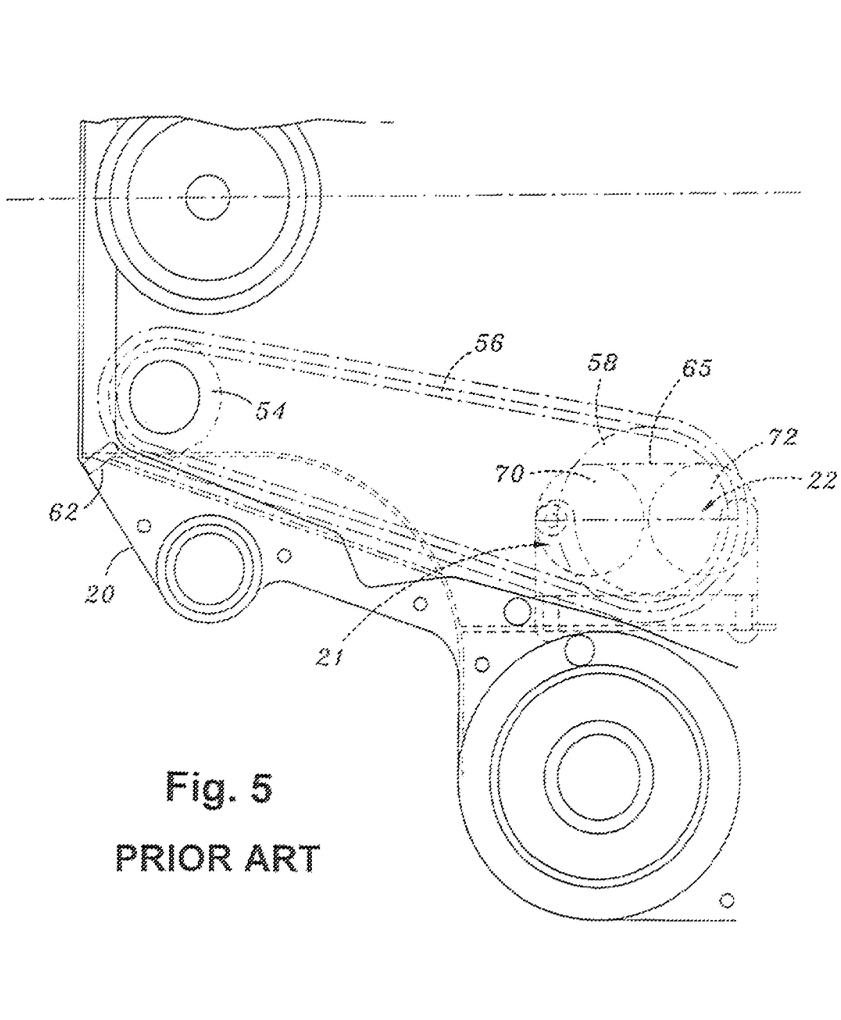
FIG. 5 is an enlarged partial top view of the back right side of the camera dolly shown in FIG. 1.

Referring to FIGS. 3, 4 and 5, a receiver tube 50 is rotatably mounted at the back end of the chassis 20 on bearings 52. The arm control 16 is irrotatably secured to the upper end of the receiving tube 50. A post sprocket 54, preferably having 20 teeth is irrotatably attached to the bottom end of the receiver tube 50. A hydraulic valve 60 is mounted within the chassis 20 in front of the receiver tube 50. A valve sprocket 58, preferably having 32 teeth, is attached on top of the valve 60. The valve sprocket 58 is linked to the post sprocket 54 via a roller chain 56.

Figure 6:
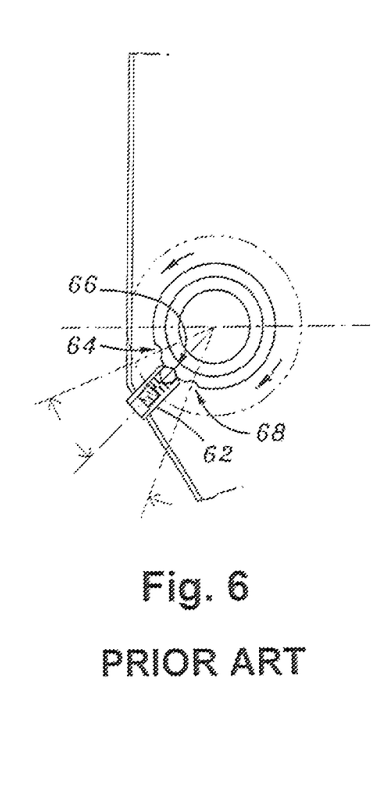
FIG. 6 is an enlarged top view, in part section, showing details of the detent shown in FIG. 5.
Figure 7:
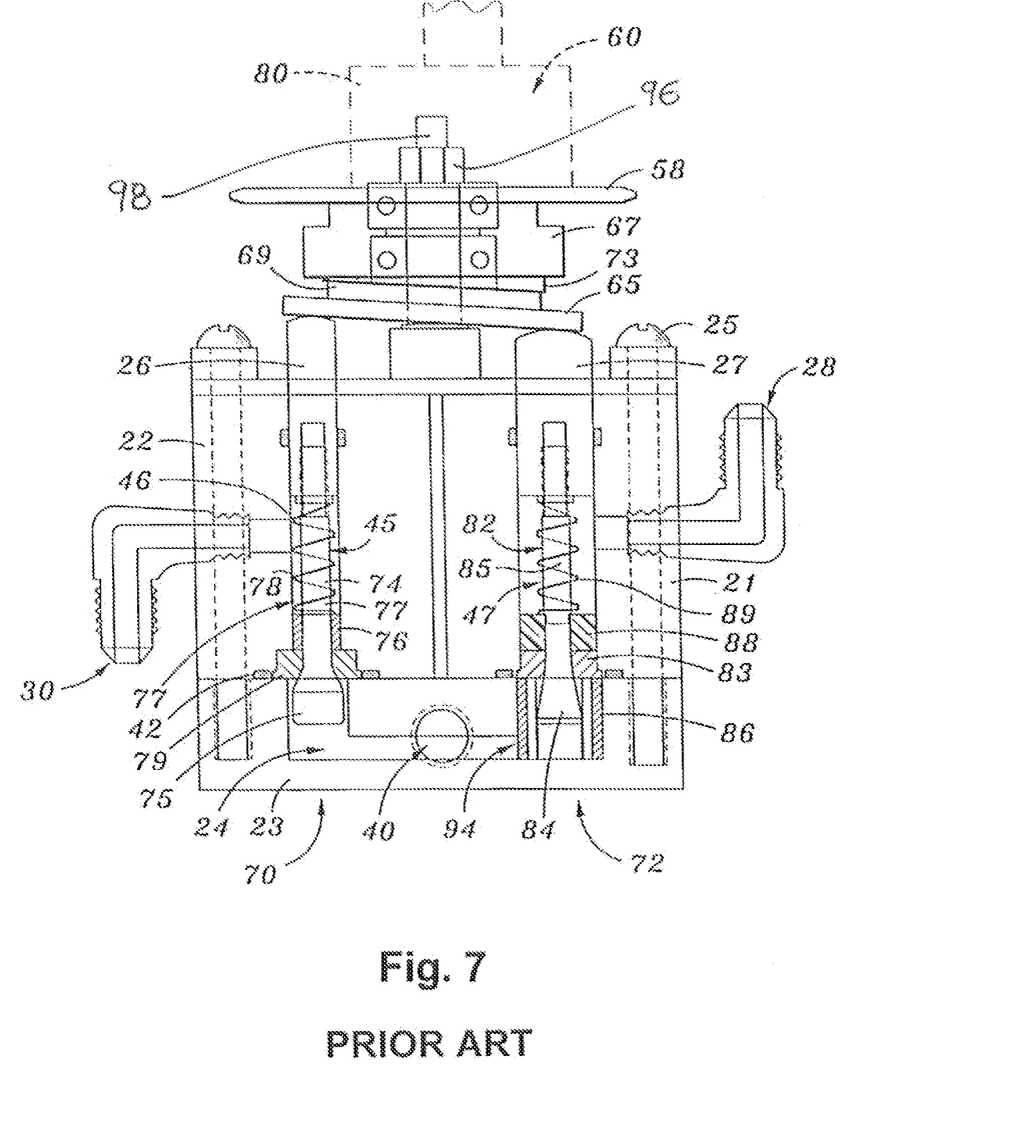
FIG. 7 is a side elevation view, in part section, of the hydraulic valve shown in FIGS. 3-5.

Referring to FIGS. 5 and 6, the receiver tube 50 has three detent grooves or dimples: a down groove 64, a stop groove 66, and an up groove 68. A ball detent 62 on the chassis is positioned to engage these grooves. Referring to FIGS. 5 and 7, the hydraulic valve 60 has a valve body 22 generally divided into an up side 70 and a down side 72. A valve base 23 is bolted onto the valve body 22. A port 40 extending into the valve base 23 connects to a passageway 24 leading into an up bore 45, which connects to an up outlet 30 extending out of the valve body 22.

Similarly, on the down side 72 of the valve 60, the port 40 extends through the passageway 24 to a down bore 47 in the down valve body 21. A return port 28 extends through the down valve body 21 and joins into the down bore 47. The junctions between the passageway 24 in the valve base 23 and the up bore 45 and down bore 47 in the down valve bodies 21 and 22 are sealed by O rings 42, compressed by bolts 25 clamping the valve body and valve base together.

An up pin 74 is centered in position within the up bore 45 via a steel bushing 76 (which is preferably pressed into the up bore 45.) The bushing 76 and the shaft 77 of the up pin 74 are dimensioned to create a small annular opening around the shaft for hydraulic fluid passage. The upper end of the shaft 77 of the up pin 74 is threaded into a piston 26 which bears against a swash plate 65 which reacts against a Teflon washer 69 over the swash plate 65. The valve sprocket 58 is attached to and rotates with a cam 67. The Teflon washer 69 is sandwiched between the swash plate 65 and the eccentric bottom surface 73 of the cam 67.

As the cam turns, it depresses either of the pistons 26 and 27. Alternatively, a glass filled Teflon washer or a needle bearing plate may be used in place of the Teflon washer 69, for faster valve response. The swash plate 65 generally does not turn with the valve sprocket 58. The lower end of a compression spring 46 rests on the bushing 76 with the upper end of the compression spring 46 pushing on the piston 26. A steel valve seat 79 in the valve body 22 seals the up bore 45 closed when the head 75 of the up pin 74 engages the seat 79.

On the down side 72 of the hydraulic valve 60, a head insert 86 is pressed into the valve base 23. A head bore extends through the head insert 86 and connects to the passageway 24 through a cutout 94 in the side cylindrical surface of the head insert 86. Side channels extend through the head insert 86. A steel valve seat 83 is positioned in the valve body 22 above the head insert 86.

Referring to FIG. 7, a shaft insert 88 is pressed into the down bore 47, above the valve seat 83. The shaft insert 88 has a through bore 96, dimensioned to closely fit around the shaft 85 of the down pin 82. Grooves on the outside of the shaft insert 88 allow hydraulic fluid to flow through the down bore 80 past the shaft insert 88. A piston 27 is threaded onto the upper end of the shaft 85 of the down pin 82. A spring 89 biases the down pin 82 upwardly with the piston 27 bearing against the swash plate 65.

As best shown in FIG. 5, the post sprocket 54 is smaller than the valve sprocket 58. In the preferred embodiment, the post sprocket 54 has 20 teeth and the valve sprocket 58 has 32 teeth. This provides a 1:1.6 ratio between turning movement of the arm control post 16 and turning movement of the valve sprocket 58 and the cam 67. In prior designs, a 1:1 ratio was used, making the valve highly sensitive to movement of the arm control post 16, so that even a slight movement of the arm control post 16 would result in a rapid movement of the arm 12. The design shown in FIG. 5 makes operation of the dolly easier because more turning movement of the arm control post 16 is needed to actuate the valve 60 and cause the arm 12 to move. As a result, the operator can more easily avoid camera positioning errors caused by the arm moving too fast or too slow.

In use, hydraulic lines are connected to the down outlet 28, up outlet 30 and to the port 40, to connect the valve 60 into the hydraulic system of the camera dolly 10. To raise the arm 12 of the camera dolly 10, the boom or arm control post 16 is turned counterclockwise (when viewed from above as in FIG. 6). The arm control post turns the receiver tube 50, and the post sprocket 54 on the receiver tube 50. Consequently, the valve sprocket 58 turns in the same direction, but through a reduced angle of rotation. As the valve sprocket 58 turns, the swash plate pushes down on the piston 26 causing the head 75 of the up pin 74 to move away from the seat 79. The up side 70 of the hydraulic valve 60 is then opened, allowing hydraulic fluid to flow through the port 40, the passageway 24, through the annular space between the bushing 76 and shaft 77 of the up pin 74, through the up bore 78, and out through the up outlet 30, to drive the hydraulic actuator 18 up and raise the arm 12.

Lowering the arm is performed by turning the arm control post clockwise, opening the down side of the valve, and allowing hydraulic fluid to return from the actuator, through the down bore 47, through the side channels 92 in the head insert 86, through the grooves 98 on the shaft insert 88, out of the return port 28, to a sump or reservoir.

Referring to FIGS. 2, 5-7, when the arm control post 16 is turned to a position so that the detent 62 engages the stop groove 66, the swash plate 65 is positioned so that both pistons are up and both sides of the valve 60 are closed. Consequently, no hydraulic fluid can flow through the valve 60 and the arm 12 remains in a fixed position. When the arm control post 16 is turned so that the detent 62 engages the up groove 68, the swash plate 65 is positioned so that the up side 70 of the hydraulic valve 60 is on the verge of opening. Further counterclockwise turning of the arm control post 16, even by a small amount, causes the up side 70 of the valve 60 to open, so that the arm 12 moves virtually simultaneously with the further turning movement of the arm control post 16.

Similarly, when the arm control post 16 is turned so that the detent 62 engages the down groove 68 in the receiver tube 50, the down side 72 of the hydraulic valve 60 is on the verge of opening. As the arm control post 16 is turned further counterclockwise, as shown in FIG. 6 the downside 72 of the valve 60 opens virtually simultaneously with the further turning movement. Accordingly, turning the arm control post to engage the up groove 64 or down groove 68 provides a "up ready" and an "down ready" position, from which the operator knows that further movement of the arm control post 16 will result in instantaneous movement of the arm 12.

When the receiver tube 50 is positioned with the detent 62 engaged into the down groove 68 or the up groove 64, no hydraulic fluid flows through the valve 60. The stop groove 66 is provided in between the up groove 64 and the down groove 68 as an additional tactile point of reference. The valve 60 remains closed at all angular positions of the receiver tube 50 between (and including) the down groove 68 and the up groove 64.

If a needle bearing 69 is used in place of a Teflon washer 69 between the swash plate 65 and the cam 67, the valve 60 may tend to close itself, when the operator releases the knob on the arm control post 16, depending on the friction in the mechanical position, hydraulic pressure, and valve position. The up force on the pistons generated by hydraulic pressure and the springs 46 and 89, creates a certain level of closing torque on the cam 67 and sprocket 58. This torque will close the valve unless it is exceeded by the piston/swash plate; chain/sprocket; bearings; and o-ring friction forces. This self-closing can be prevented by increasing tension in the chain 56 which will increase the friction acting to prevent the cam 67 from turning. A viscous fluid 80 dampener may optionally also be linked to the swash plate, to provide a smooth and controlled closing movement of the valve.

Figure 8:
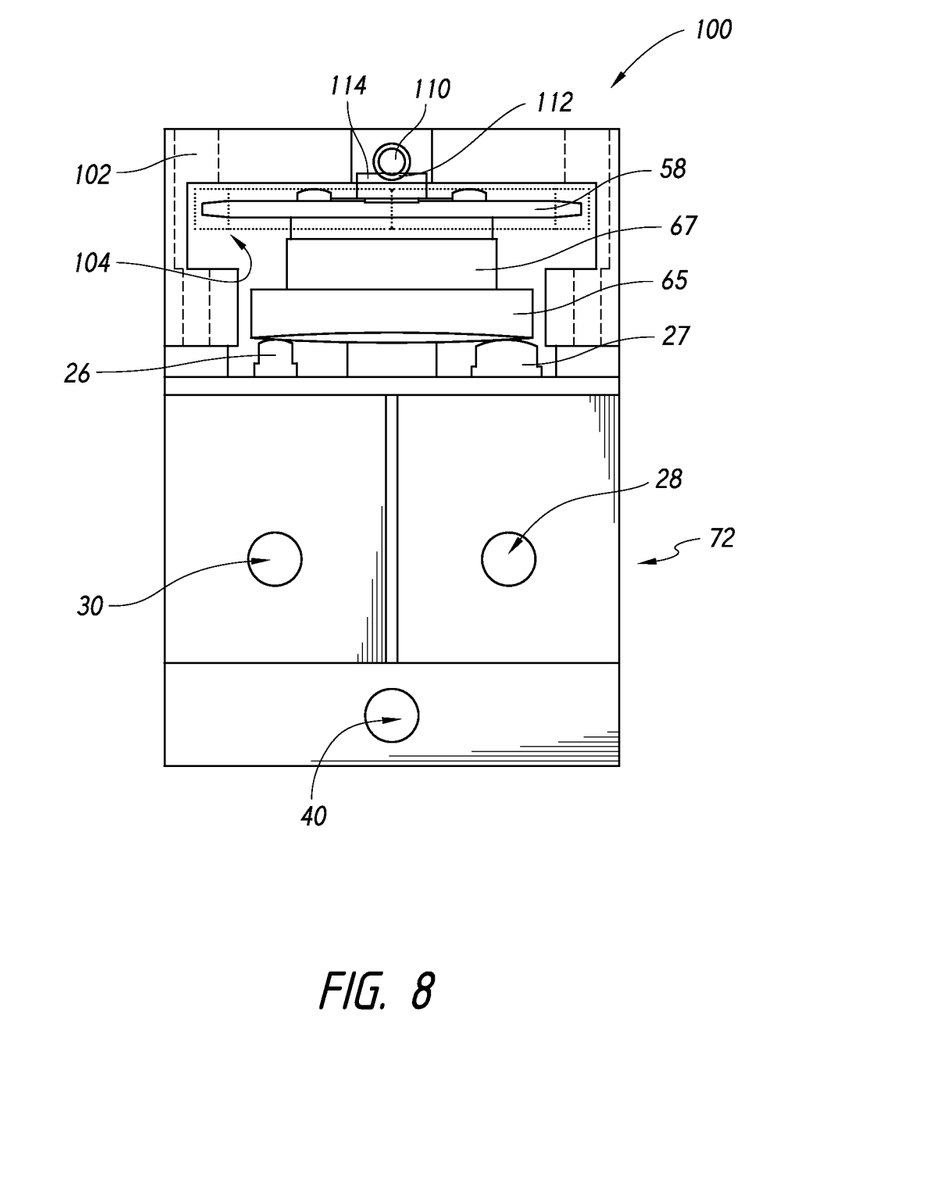
FIG. 8 is a front view of a new valve system design for providing a float down movement.
Figure 9:
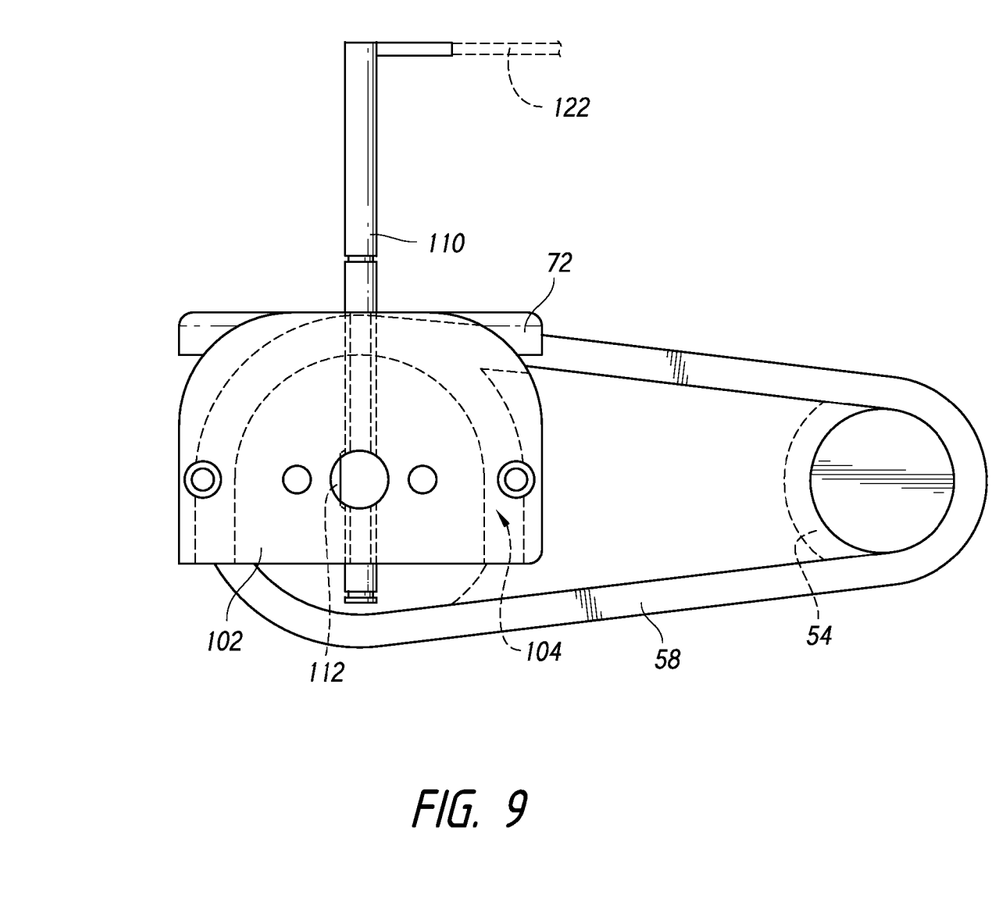
FIG. 9 is a top view of the valve system shown in FIG. 8.
Figure 10:
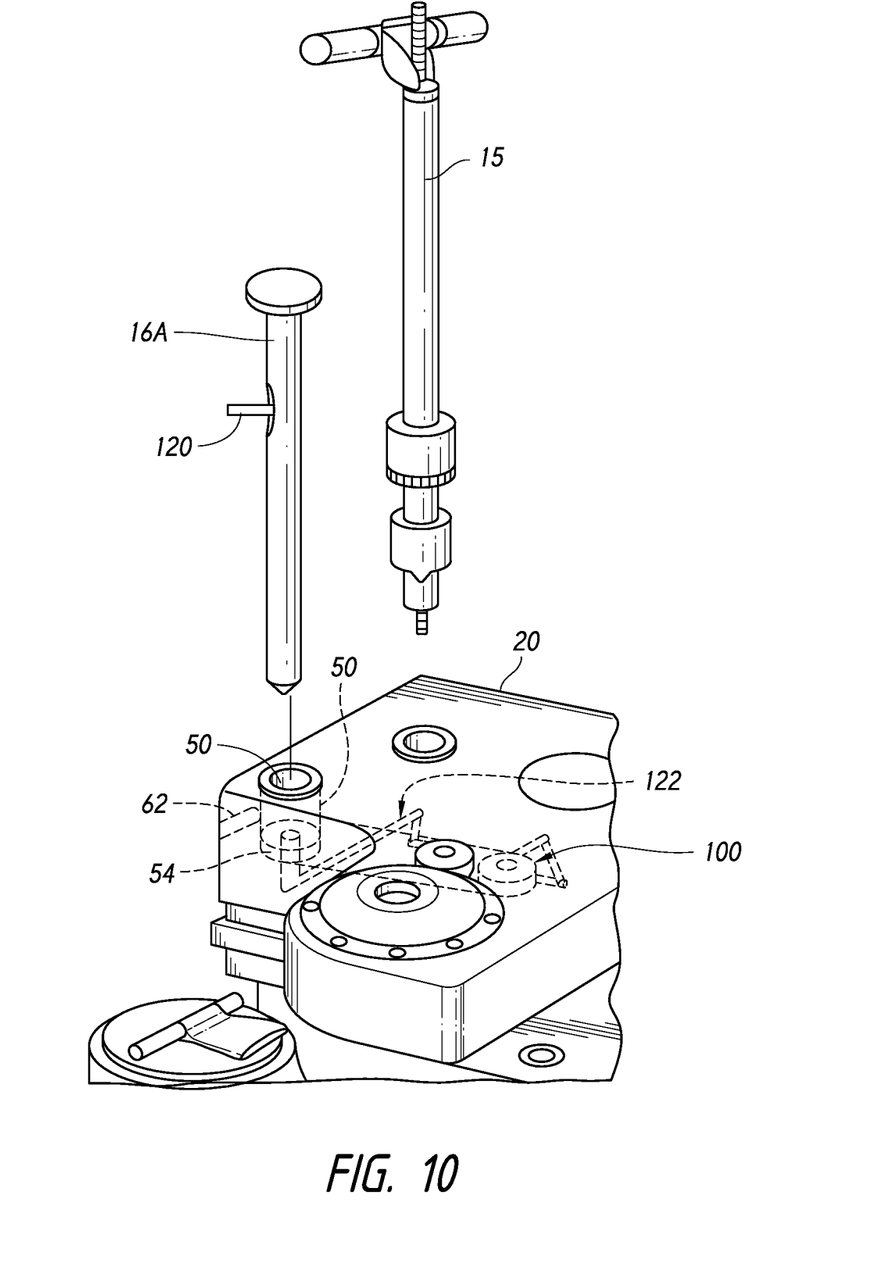
FIG. 10 is an enlarged perspective view of the back end of the camera dolly of FIG. 1 modified with a linkage for operating the valve system shown in FIGS. 8 and 9.

FIGS. 8-10 show a float down valve control system 100. When the system 100 is used, the valve 60 is controlled in a float down mode. In the float down mode, both pins 74 and 82 are slightly separated from their valve seats, creating an intentional slight leakage through the valve 60. As a result, as soon as the dolly arm reaches its highest point, as selected by the user via the arm control post 16, the arm automatically and instantaneously reverses direction and starts to move back down. Since this float down mode provides this movement automatically, the up-down movement of the arm is smoother than can normally be achieved even by a highly skilled user turning the arm control post 16 by hand. In addition, when using float down mode, the user does not need to watch the arm, determine when the desired high point is reached, and then act to reverse the direction of movement of arm. This allows the user to achieve a smooth, consistent and repeatable up-down movement, even while concentrating on other tasks, such as steering the dolly in a desired path.

As shown in FIGS. 8 and 9, the float down system 100 includes a cam shaft housing 102 attached onto the body of the valve 60. The plate nut 96 shown in FIG. 7 is removed, and the threaded post 98 is modified to allow the cam shaft housing to be bolted onto the valve body. The housing 102 fits over and around the sprocket 58. A chain slot 104 in the housing 102 provides clearance around the outside of the chain 58 on the sprocket 58. A cam shaft 110 is pivotally supported in the housing 102. A cam lobe 112 on the cam shaft 110 is held against a cam plate 114 on top of the sprocket 58. As shown in FIG. 10, a mechanical linkage 122 connects the cam shaft 110 to a hand lever 120 on a modified arm control post 16A.

With the float down system 100 in the off position, the hand lever 120 is alongside or recessed into an opening in the arm control post 16A. The valve 60 then operates as described above, under control of the arm control post 16. When a float down camera movement is desired, the user moves the lever 120 into an up or out position, as shown in FIG. 10. This movement of the lever 120 drives the linkage 122, which in turn rotates the cam shaft 110, up to ¼ turn. As the cam shaft 110 rotates, the cam lobe 112 presses down on the cam plate 114 on the sprocket and the swash plate 65. This pushes both of the valve pins 74 and 82 down, so that each pin is slightly separated from its seat. Both ports 28 and 30 of the valve are then slightly open, allowing hydraulic fluid to flow out of the actuator 18. Accordingly, regardless of position of the arm control post 16, and the volume of fluid flowing into the hydraulic cylinder 16 shown in FIG. 1, there is an automatic and constant flow of fluid out of the cylinder.

To perform a float down movement, the user actuates the float down control system 100 via movement of the lever 120. The user then turns the arm control post 16 to raise the arm. When the arm reaches the desired height, the user returns the arm control post 16 to the stop position. The user may do this by simply releasing the control post 16 with internal forces described above automatically returning the arm control post 16 to the stop position. Alternatively, if the camera dolly is set up with move internal friction in the valve control system, so that the arm control post 16 stays in position when released, the user may actively turn the arm control post 16 back to the stop position.

In either case, as the arm control post 16 and the valve 60 approach the normal stop position, the volume of fluid flowing into the hydraulic cylinder 18 declines to an inflection point where it is exceeded by the constant out flow caused by the float down system 100 holding both valve pins slightly open. As a result, the arm moves up to the desired height and then immediately reverses direction and begins moving back down, is a smooth movement. The lever 120 is then moved back to the off position.

Figure 11:
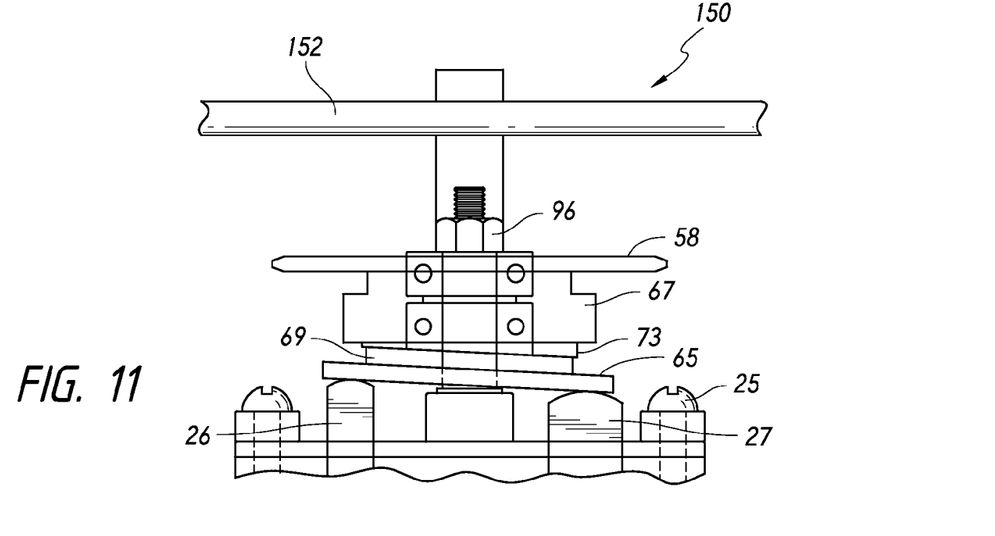
FIGS. 11 and 12 show alternative float down valve designs.

FIG. 11 shows an alternative float down system 150 similar to the design shown in FIGS. 7-10 but having a nut sprocket 152 attached to the plate nut 96, for engaging and disengaging the float down mode, instead of the linkage 122. In the design of FIG. 11, turning a post or shaft on the dolly drives a belt or chain, which turns the nut sprocket 152. The nut sprocket 152 turns the plate nut 96 on the threaded post 98. This pushes swash plate 65 down, slightly unseating both pins 74 and 82, to provide a float down mode, as described above.

Figure 12:
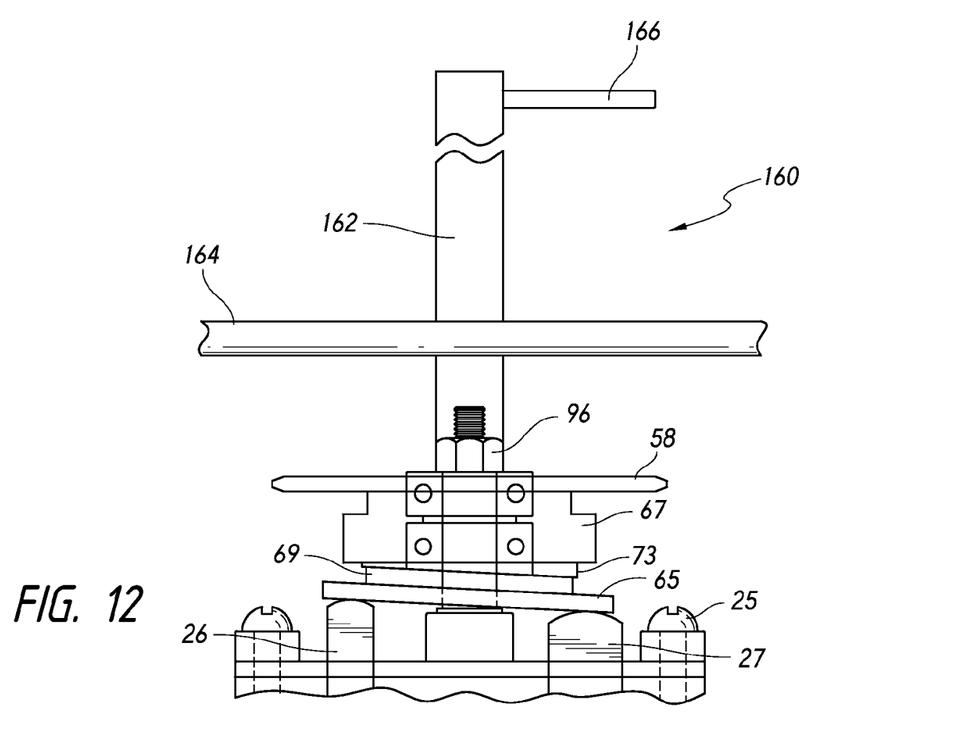

FIG. 12 shows another alternative float down system 160 similar to the design shown in FIGS. 7-11 but having a nut shaft 162 attached to the plate nut 96. The nut shaft extends up through the chassis deck 164. Grasping and turning a handle 166 rotates the nut shaft 162 and the plate nut 96, slightly unseating both pins 74 and 82, to provide the float down mode, as described above.

Figure 13:
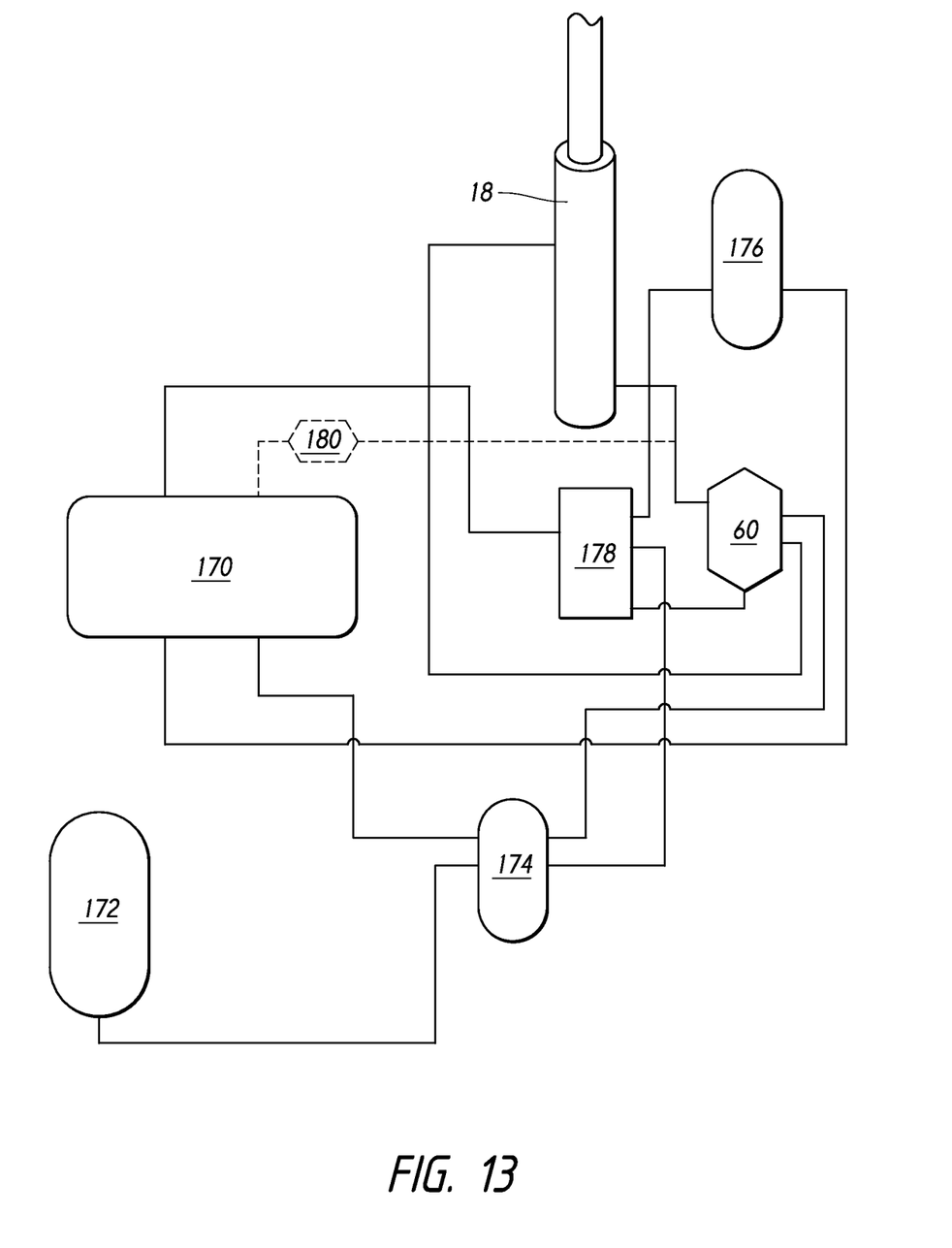
FIG. 13 is a schematic diagram of a hydraulic system having an optional fast down valve.

FIG. 13 is a schematic diagram of a hydraulic system that may be used with the camera dolly described above, with or without having a float down mode. The hydraulic system has a tank or reservoir 170, one or accumulators 172, the hydraulic cylinder or actuator 18 and the valve 60. One or both of a hand pump 174 and an electric pump 176 are also provided, with the system components connected as shown, optionally using a junction block 178. The hydraulic system may typically also include one or more pressure gages, pressure switches and relief valves, as is well known in the art.

Where the hydraulic cylinder is a one-way or single acting hydraulic cylinder, the dolly arm 12 moves down only under its own weight. If the camera on the dolly arm is lightweight, the arm may move down slowly, even with the valve 60 in the full down position. To avoid this delay, as shown in dotted lines in FIG. 13, the hydraulic system may also optionally include a fast down valve 180 connected in parallel with the control valve 60. If used, the fast down valve 180 can be opened to bypass the control valve 60, to allow the arm to drop down quickly. The fast down valve 180 may have a relatively large through bore, to allow fluid to rapidly drain out of the cylinder 18 and into the tank 170, when the fast down valve is open. The fast down valve 180, if used, may be controlled by a separate knob or lever on the arm control post or elsewhere on the dolly.

Figure 14:
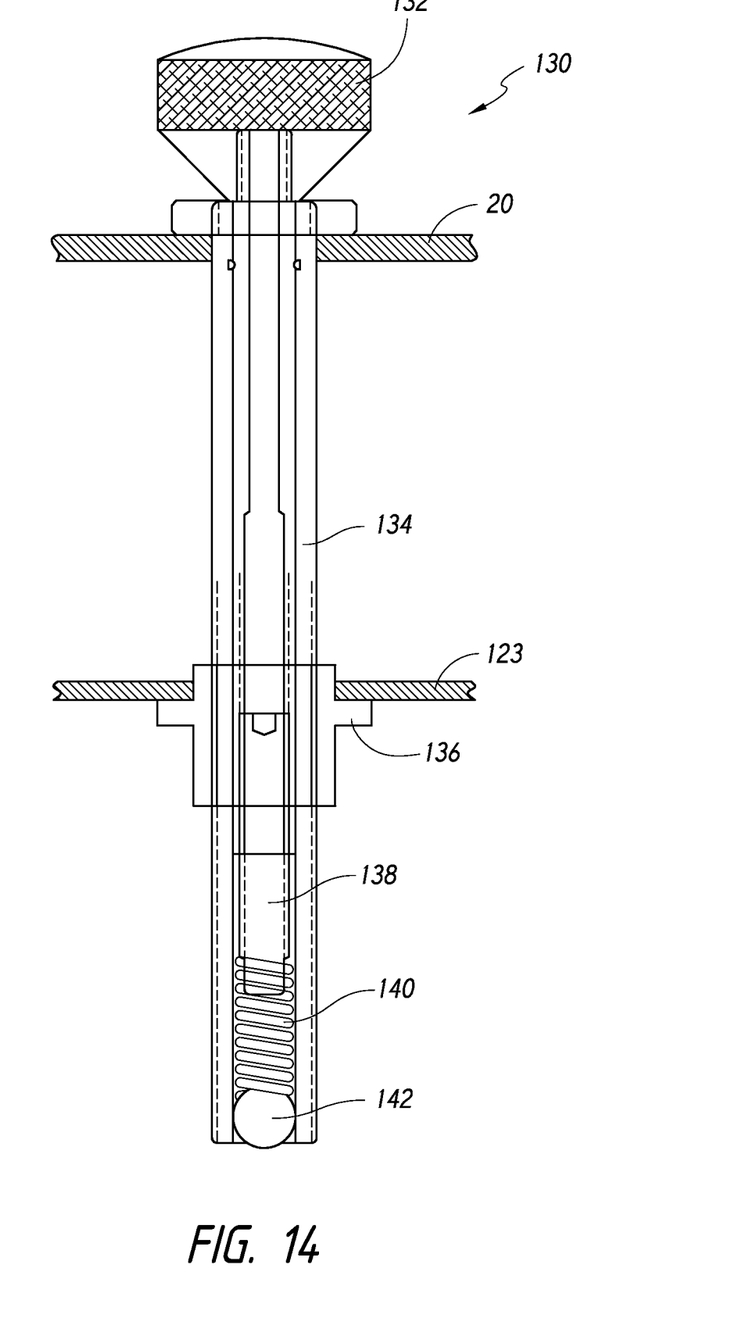
FIG. 14 is a new alternative design for the detent shown in FIG. 6.

FIG. 14 shows an improved detent release pin 130 similar to the design shown in FIG. 6. However, the detent release pin 130 may be engaged by the user to provide a tactile position indication, or disengaged to remove the detent action, according to the user's preference. As shown in FIG. 14, a knob 132 is attached to the outer end of a plunger 138 that is threaded into a shaft 134. The shaft is supported on an outer wall of the chassis 20 and via a nut 136 attached onto an inner support plate 123. A spring 140 is provided at the inner end of the plunger 138. The spring 140 drives a ball 142 against the lower end of the arm control post 16, similar to the arrangement shown in FIGS. 3-6.

By turning the knob clockwise, the plunger 138 is advanced to firmly press the ball 142 against the outer surface of the arm control post 16. As a slot or groove 64, 66 or 68 moves into alignment with the ball 142, a detent function is provided, as described above. If no detent function is desired, the knob 132 is backed off and the force holding the ball against the arm control post 16 is removed, removing the detent function.

Thus, a novel float down valve control system for a camera dolly has been shown and described. Various modifications and substitutions of equivalents may of course be made without departing from the spirit and scope of the invention. The invention, therefore, should not be restricted, except by the following claims and their equivalents.

The invention claimed is:

1. A camera dolly or camera crane comprising:
   an arm pivotably attached to a base;
   a hydraulic system, including:
     a hydraulic cylinder attached to the arm and to the base, for raising the arm; and
     a hydraulic valve and a valve control on the base, the hydraulic valve having a normal operation mode where opening and closing of the valve is controlled by the valve control, and a float down mode, where the valve remains partially open, regardless of operation of the valve control.

2. A camera dolly or camera crane, comprising:
an arm supported on a chassis;
a hydraulic cylinder pivotally attached to the arm and to the chassis;
a valve linked to the hydraulic cylinder and to a pressurized hydraulic fluid source, with the valve including a valve body containing a first spring biasing a first pin into engagement with a first seat, and a second spring biasing a second pin into engagement with a second seat, and a swash plate supported on the valve body to selectively move the first and second pins;
a cam or a nut movable from a first position wherein the first and second pins can seal against the first and second seats, respectively, to a second position wherein the cam or nut displaces the swash plate and holds the first and second pins apart from the first and second seats, respectively.

3. The camera dolly of claim 2 further comprising an arm control post rotatably attached to the chassis, an actuation lever on or in the arm control post, and a linkage connecting the actuation lever to the cam or nut.

4. The camera dolly of claim 2 further comprising a cam shaft housing attached to the valve body, a cam shaft extending through the cam shaft housing, and a cam on the cam shaft positioned to linearly displace the first and second pins with rotation of the cam shaft.

5. The camera dolly of claim 1 with the hydraulic system further including a fast down valve connected in parallel to the valve, for allowing the arm to quickly move down regardless of the load on the arm.

6. A camera dolly, comprising:
an arm supported on a chassis;
a hydraulic cylinder linked to the arm;
a valve connected via hydraulic lines to the hydraulic cylinder and to a pressurized hydraulic fluid source, with the valve shiftable from a normal mode of operation to a float-down mode of operation, and vice versa, and the valve including a first pin moveable via a valve plate to make or break a first seal with a first seat, and a second pin moveable via the valve plate to make or break a second seal with a second seat, when the valve is in the normal mode of operation;
a cam or a nut movable from a normal position wherein the cam or nut does not substantially displace the valve plate and both the first and second pins can seal against the first and second seats, respectively, for normal valve operation, to a float-down position wherein the cam or nut displaces the valve plate and holds the first and/or second pins apart from the first and second seats, respectively, for float down valve operation, wherein the arm rises to a peak height and then automatically descends.

7. The camera dolly of claim 6 further comprising a linkage connecting the cam or nut to an actuation lever for switching the valve between normal and float down modes of operation.

8. The camera dolly of claim 6 further comprising a cam shaft housing attached to the valve, a cam shaft extending through the cam shaft housing, and a cam on the cam shaft positioned to linearly displace the first and second pins with rotation of the cam shaft.

9. The camera dolly of claim 6 further including a fast down valve connected in parallel to the valve, for allowing the arm to quickly move down regardless of the load on the arm.

* * * * *